(12) United States Patent
Shi et al.

(10) Patent No.: US 10,499,209 B2
(45) Date of Patent: Dec. 3, 2019

(54) INSTALLATION IDENTIFICATION FOR FAMILY APPLICATIONS

(71) Applicant: Facebook, Inc., Menlo Park, CA (US)

(72) Inventors: Weizhe Shi, San Carlos, CA (US); Yang Gao, Foster City, CA (US); Jian Gong, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 283 days.

(21) Appl. No.: 15/212,121

(22) Filed: Jul. 15, 2016

(65) Prior Publication Data

US 2018/0020087 A1    Jan. 18, 2018

(51) Int. Cl.
*H04W 4/21* (2018.01)

(52) U.S. Cl.
CPC ..................................... *H04W 4/21* (2018.02)

(58) Field of Classification Search
CPC ........................................................ H04W 4/21
See application file for complete search history.

(56) References Cited

U.S. PATENT DOCUMENTS

| 2010/0325122 | A1* | 12/2010 | Yassin | G06F 8/60 707/759 |
| 2012/0290369 | A1* | 11/2012 | Acosta-Cazaubon | G06Q 50/26 705/14.4 |
| 2015/0319144 | A1* | 11/2015 | Barton | H04L 63/0428 713/168 |
| 2015/0365399 | A1* | 12/2015 | Biswas | G06F 9/00 726/8 |

* cited by examiner

*Primary Examiner* — Nicholas P Celani
(74) *Attorney, Agent, or Firm* — Baker Botts L.L.P.

(57) ABSTRACT

In one embodiment, a method includes, by a second application that is a member of a family of applications and is installed on a client device, broadcasting a communication that includes a second hashed installation identifier and a second timestamp, the second timestamp indicating a time that the second application was installed on the client device, and receiving a response from a first application, wherein the first application is a member of the family of applications, and wherein the response includes a first hashed installation identifier and a first timestamp indicating a time that the first application was installed on the client device. The method may also include the second application comparing the second timestamp to the first timestamp, and if the first application was installed on the client device before the second application, the second application may save the first hashed installation identifier as a family identifier.

16 Claims, 5 Drawing Sheets

INSTALLATION IDENTIFICATION FOR FAMILY APPLICATIONS

TECHNICAL FIELD

This disclosure generally relates to data sharing.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments disclose a method to enable data sharing across family applications. When a parent entity acquires, creates, or otherwise controls one or more child entities, and all the entities have applications for client systems, it is useful for all the entities to share information with each other. The parent and child entities may be referred to as a family. For example, consider that two applications—Application A and Application B—may be controlled by the same parent entity. A user may download Application A on her device and create an account using her email address. Later, she may download Application B and create an account using a unique username that is unrelated to her email address. These two applications may share information about the user by creating a "family installation ID." In particular embodiments, the parent entity or one of the child entities may create a "family installation ID" based on the installation ID (e.g., a unique string identifying that application) belonging to the oldest currently installed application in the family. The installation ID may be a 128 bit randomly generated universally unique ID (UUID). Each application in the family that is installed thereafter may initially send out a broadcast message to all other applications in order to detect whether any other applications in the family are already installed on the device—if yes, then the newly installed application adopts the "family installation ID" of the oldest currently installed application (e.g., the installation ID of the oldest currently installed application). The age of applications may be determined by their timestamps (e.g., apps installed earlier have an earlier timestamp).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
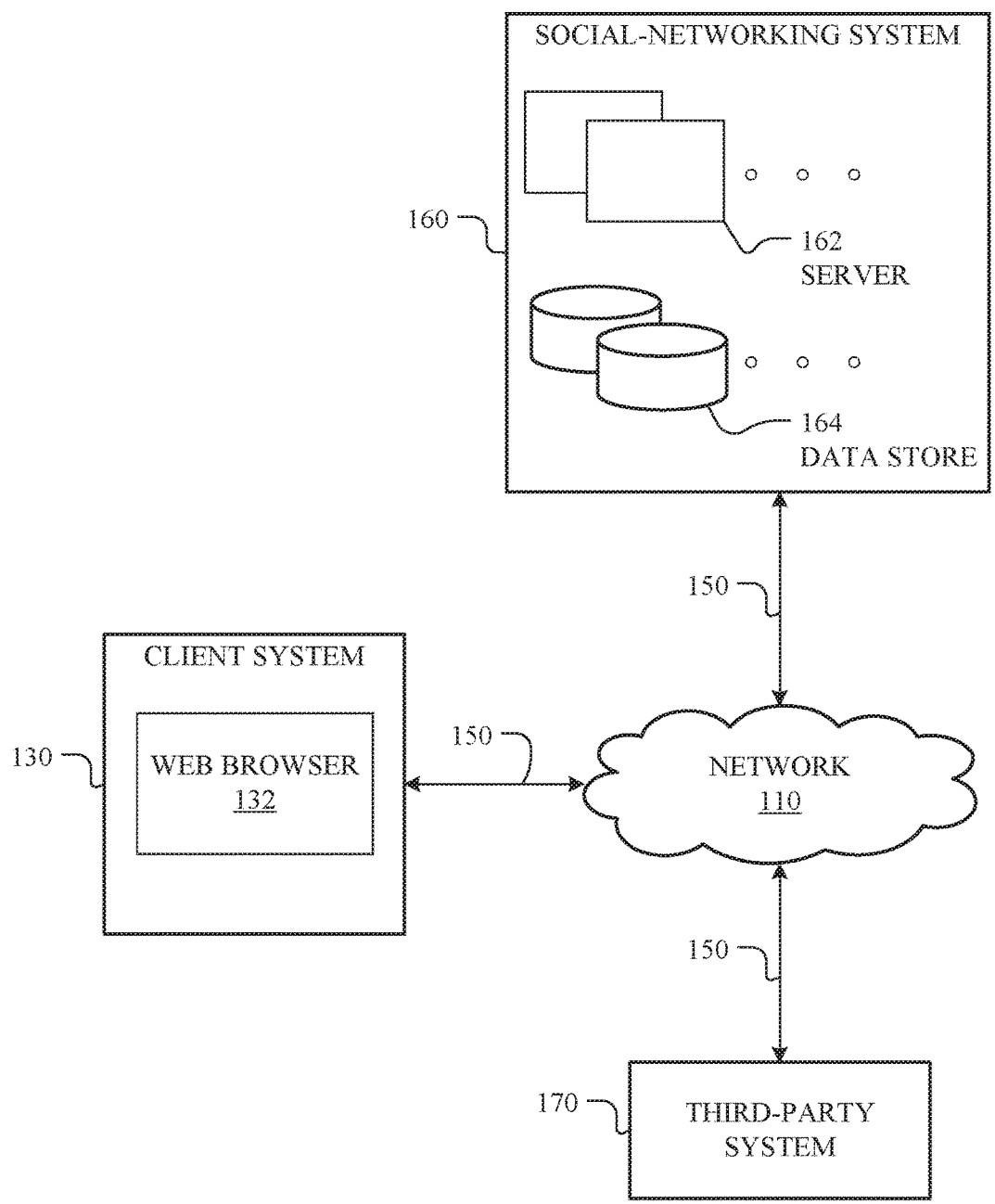
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
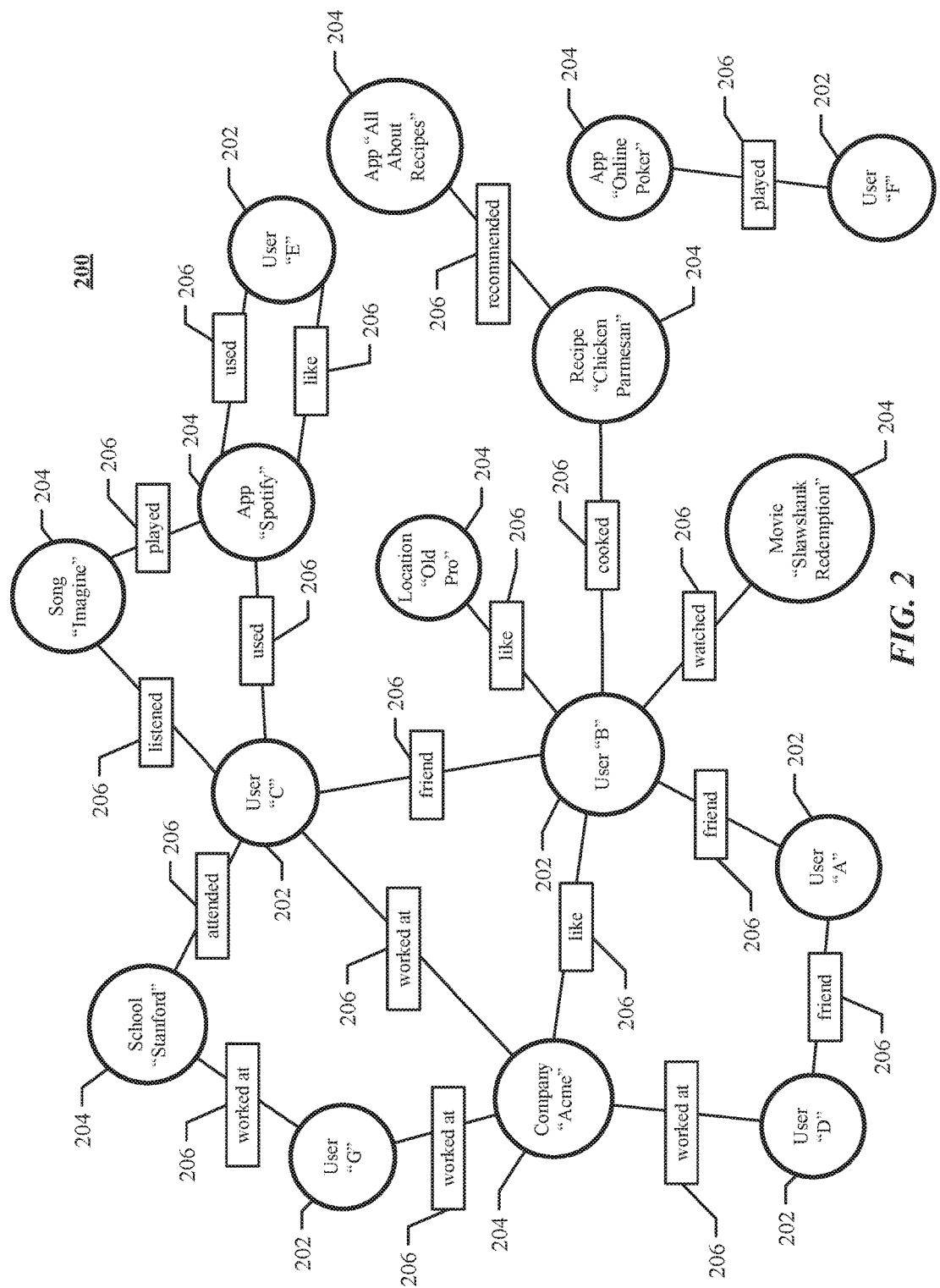
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
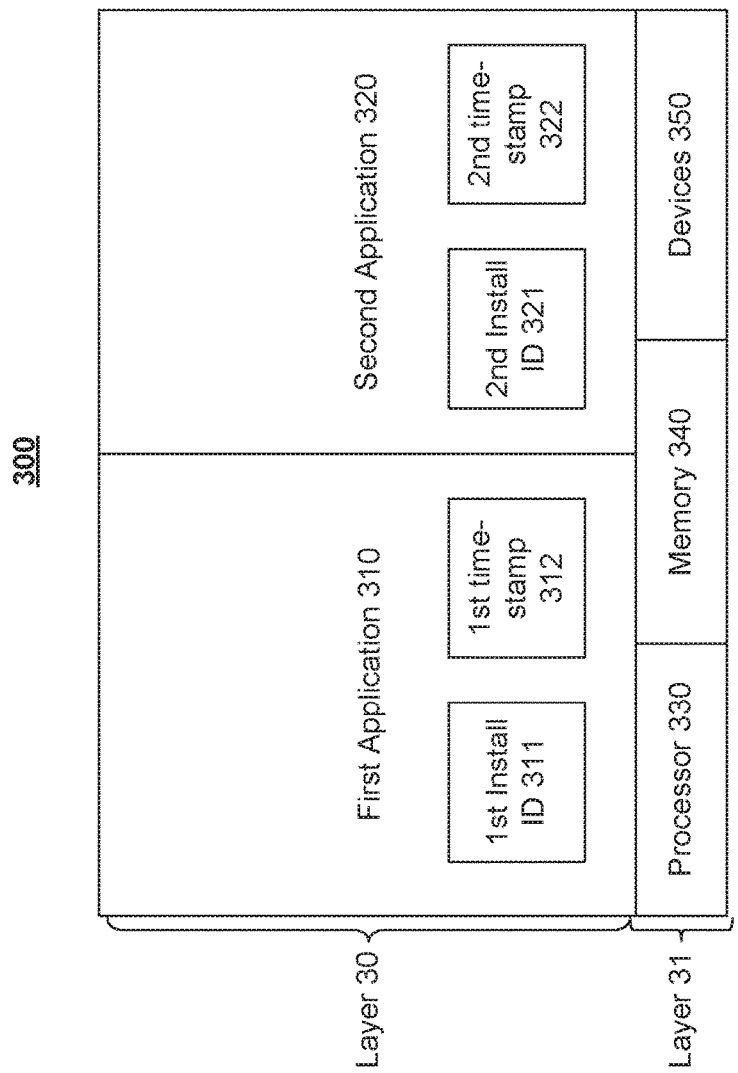
FIG. 3 illustrates an example architecture environment for enabling data sharing across family applications.

FIG. 3 illustrates an example architecture environment 300 for enabling data sharing across family applications. Architecture environment 300 may be located on client system 130. Client system 130 may be a client device. Architecture environment 300 may include layer 30 and layer 31. Layer 30 may include first application 310 and second application 320. First application 310 may include first installation identifier ("ID") 311 and first timestamp 312. First installation ID 311 may be a unique identifier that identifies the application it is associated with. For example, first installation ID 311 may be a randomly generated 128-bit standard universally unique identifier (UUID), or other suitable hashed code. In addition to first installation ID 311, first application 310 may also include one or more other installation IDs, wherein each installation ID corresponds to another application in the family. For example, first application 310 may include both first installation ID 311 and second installation ID 321. These additional installation IDs may be stored in an SDK library. The SDK library may accompany every application that belongs to the family. Within the SDK, a file may list the hashed codes for all the installation IDs for the applications in the family. Second application 311 may include second installation ID 321 and second timestamp 322. Second installation ID 321 may be a UUID or other suitable hashed code, meaning that it may be a unique identifier that identifies the application it is associated with. In addition to second installation ID 321, second application 320 may also include one or more other installation IDs, as discussed above with reference to first application 310. Layer 31 may include processor 330, memory 340, and devices 350. First application 310 and second application 320 may also have allocated memory for storing a family installation ID, which may initially store a null value. Family ID may be intended to be a family identifier used to identify applications belonging to the same family (e.g., applications controlled, owned, or operated by the same parent entity). Each application in the family may have its own application signature (e.g., application signing certificate). The application signature may be referred to as an authentication key. An installation ID may be a unique string that identifies a particular application. The installation ID of applications within the family may be hashed. In addition to its own installation ID, each application may also store the installation IDs of other applications in the family. In particular embodiments, the installation IDs of the applications in the family may be stored in an SDK library, which may be shipped as part of the application.

To provide context, a parent entity (e.g., Facebook) may acquire, create, or otherwise control other entities (e.g., Instagram, Whatsapp, Oculus). These entities may be referred to as child entities. These child entities may have applications that come from different publishers—the developers are represented as different entities in an applications store (e.g., the Apple App Store, Google Play). Because the child entities are different entities, their applications may be unable to share data securely. The parent entity may wish to share data gathered from a user's actions on one application with the other applications. For example, a user's activity in the Facebook app may be useful in determining how a user may act within the Instagram app. Thus, using a single "installation ID" for the family of applications that links the identities that a user has on multiple applications on the same device would enable the parent entity to share data across all applications operated by itself or its child entities.

For example, a user may have Facebook, Instagram, and Whatsapp on her phone. She may use different account information on each application. For example, her Instagram account may have a first username, her Facebook account may have a second username, and her Whatsapp account may have a phone number. The parent entity may be unable to determine that these different accounts with different account information belong to the same person. In order to address this issue, particular embodiments may create a "family installation ID" based on the installation ID (e.g., UUID) of the oldest currently installed application in the Facebook family. Each application in the family that is installed thereafter may initially send out a broadcast message to all other applications in order to detect whether any other applications in the family are already installed on the device—if yes, then the newly installed family application may adopt the "family installation ID" of the oldest currently installed application of the family (i.e., the UUID of the oldest currently installed application). The ages of applications may be determined by their timestamps (e.g., apps installed earlier have an earlier timestamp).

In this manner, the family installation ID may end up being the same for all applications in the family that are installed on a single device (because each application adopts the existing family installation ID upon being installed) and thereby may function as a strong signal that the different accounts are associated with the same person. Other factors to determine whether different accounts are associated with the same person may include IP data (e.g., IP address), and device information (e.g., device brand, model, manufacturer). This data may help to determine a pattern of accessing the network through a particular device. (The need to look at such generic information is driven by the fact that more specific information, e.g., IMEI, serial number, MAC address, is restricted by some platform's (e.g., Android) terms of use.)

To continue the above example, if a user installs Whatsapp on her device and later installs the Facebook App on her device, the family installation ID may allow the user to skip account creation steps. The Facebook app may use the Whatsapp account credentials to automatically create an account and login credentials for the Facebook App. In addition, The data gathered by enabling the family installation ID may be used in three different tiers: (1) top-line metric deduping—this may be used to calculate the total monthly and daily users of a family of applications; (2) any user-facing features powered by the data gathered as a result of the family installation ID and (3) advertisements (e.g., applications in the same family may share user behavior with each other and use this to serve more targeted advertisements).

Figure 4:
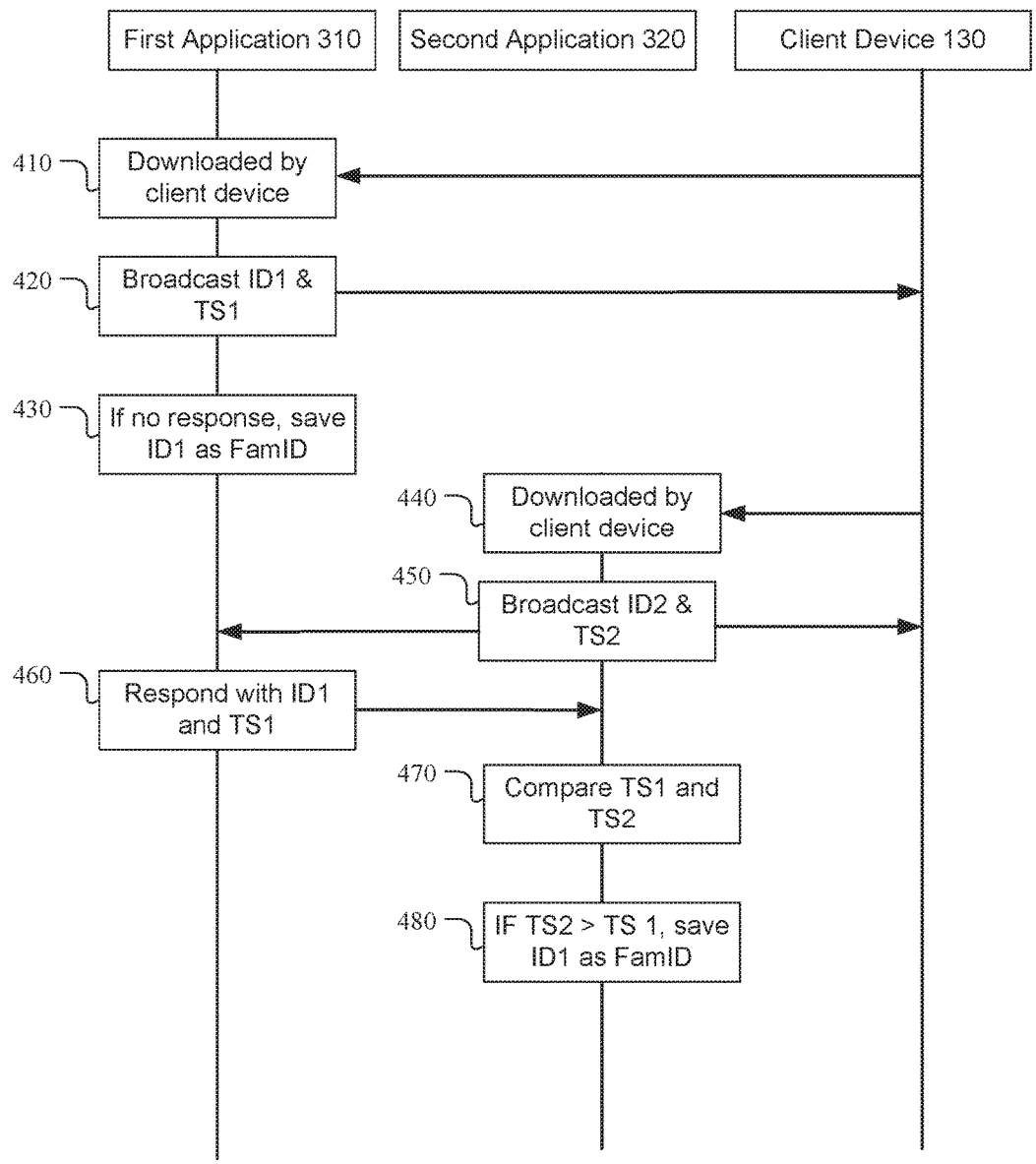
FIG. 4 illustrates an example interaction diagram for enabling data sharing across family applications.

FIG. 4 illustrates an example interaction diagram for enabling data sharing across family applications. The interaction diagram may include first application 310, second application 320, and client system 130. The interaction diagram may begin at step 410, where client system 130 may download first application 310. First application 310 may be a social networking application, a gaming application, a productivity application, or any suitable application available for download via network 110. At step 420, first application 310 may broadcast its first installation ID 311 to all the other applications currently installed on client system 130. In particular embodiments, first application 310 may also broadcast first timestamp 312 to all the other applications currently installed on client system 130. Broadcasting first installation ID 311 and first timestamp 312 may serve the purpose of checking whether other applications in the family are currently installed on client system 130. Some platforms (e.g., Android) may provide an inter-process communication (IPC) mechanism, one of which uses a broadcast intent system, which means that all apps on the Android system may communicate with each other. This may be useful when attempting to communicate with applications that were recently installed (where existing applications may not yet know of their existence). However, such IPC messages may not be secure.

To make a secure way for family applications to communicate with each other, an upper layer protocol may be needed. This upper layer protocol may require information to be verified or authenticated via an authentication layer. The authentication layer may have a hash code of the application signatures associated with each application in the family as well as a list of authenticated applications. The authentication layer may include the business logic built on top of the intent-based communication mechanism. The hash code of the application signature (e.g., signing certificate) may also be referred to as an authentication key. Any application can request an installation ID. The installation ID may be used to determine if the request comes from an application in the family. If a request comes from an application outside the family, the parent entity may ignore the request. The parent entity may scan through the available applications stored on client system 130 and use the hash code to filter out untrusted applications. Then the patent entity may send the installation ID request to one or more trusted applications. With regard to the receiving side, once the parent entity receives the request from other applications, it checks the intent and verifies whether there is an authentication key in the request, and verifies the authentication key against the hashed application signature that is stored on client system 130. If that passes the authentication process, then the parent entity can simply share the installation ID with the other application, because it has verified that it is a member of the same family.

At step 430, if no response is received from any of the other applications installed on client system 130, first application 310 may save first installation ID 311 as a family ID. At step 440, client system 130 may download and install second application 320. Second application 320 may be a social networking application, a gaming application, a productivity application, or any suitable application available for download via network 110. Second application 320 and first application 310 may be controlled by the same parent entity. Thus, second application 320 and first application 310 may be considered to be part of the same family. At step 450, second application 320 may broadcast second installation ID 321 and second timestamp 322 to all the other applications currently installed on client system 130. Broadcasting second installation ID 321 and second timestamp 322 may serve the purpose of checking whether other applications in the family are currently installed on client system 130. In this particular case, first application 310 may already be installed on client system 130. In this case the interaction diagram may proceed to step 460, where first application 310 may respond with first installation ID 311 and first timestamp 312. At step 470, second application 320 may compare first timestamp 312 with second timestamp 322. If second timestamp 322 is greater than first timestamp 312, this may indicate that first application 310 was downloaded and installed on device 130 before second application 320, because the age of apps are determined by their timestamps (e.g., apps installed earlier have an earlier timestamp). If this is the case, the interaction diagram may proceed to step 480, in which second application 320 may same first installation ID 311 as its family ID.

In particular embodiments, a method may comprise: by second application 320 that is a member of a plurality of family applications and is installed on client system 130, broadcasting a communication comprising second installation 321 and second timestamp 322, (second timestamp 322 may indicating a time that the second application was installed on client system 130). The method may further include, by second application 320, receiving a response from first application 310, wherein first application 310 is a member of the plurality of family applications, and wherein the response comprises a first installation ID 311 and a first timestamp 312 indicating a time that first application 310 was installed on client system 130; by second application 320, comparing the second timestamp 322 to the first timestamp 312; by the second application 320, saving the first installation identifier 311 as a family identifier if the comparing reveals that the first application 310 was installed on the client system 130 before the second application 320 was installed on the client system 130.

In particular embodiments, the method may further comprise by first application 310, broadcasting a communication comprising first installation ID 311 and first timestamp 312, and also by first application 310, saving first installation ID 311 as the family identifier if first application 310 does not receive a response that comprises a hashed installation identifier. This may reflect the case where first application 310 is the first application in its family to be installed on a particular client system 130. In particular embodiments, client system 130 may not provide any shared memory accessible by both first application 310 and second application 320. This may occur as a result of privacy concerns.

In particular embodiments, the method may further comprise validating first installation ID 311, and wherein the determining that the first application was installed prior to the installation of the second application further comprises checking the first timestamp and the second time stamp and determining that the first timestamp is earlier in time than the second timestamp. In particular embodiments, validating first installation ID 311 may comprise determining whether first installation ID 311 appears in a list of a plurality of installation identifiers, wherein each installation identifier of the plurality of installation identifiers corresponds to an application within the plurality of family applications. In particular embodiments, the list of the plurality of installation identifiers is stored in a library stored on client system 130. The installation identifiers of all the applications in the family may be stored in an SDK library. The SDK library may ship with every application that belongs to the family. Within the SDK, a file lists all the installation identifiers for all the applications with their associated application signatures. In particular embodiments, the sender only sends the request to family applications. The receiver may only answer requests from authenticated senders. That way, if an application outside the family sends a request to a family application, the family application may ignore the request.

In particular embodiments, the list of the plurality of installation identifiers may be updated upon installation of second application 320. This may occur because the parent entity may have acquired, created, or otherwise gained control of another child entity. Some platforms (e.g., Android) may allow the parent entity to obtain the installation IDs of all the family applications. The parent entity may use the installation IDs to determine which applications are in the family, and then it may request their Installation IDs. The SDK may have an API to start the process. This may enable a synchronization process that may be scheduled on a recurring basis. This may occur whenever a new app is downloaded onto a device. The SDK library may be updated whenever there is an acquisition of a child entity, or at any other suitable time (e.g., at the creation of a new child entity).

In particular embodiments, when client system 130 downloads an application in the family, it downloads the SDK library with the application. At any given moment, client system 130 may have a fully updated list of all the applications in the family. For newly installed application, client system 130 may perform an initial synchronization to jumpstart the user experience (e.g., skip a login interface, load a customized interface based on data shared by other family applications). For existing applications, every time the parent entity pulls data from another application, client system 130 may send out the installation ID of the application (e.g., app signature of the application), and the receiver application may read the installation ID and verify it against the list of installation IDs of family applications. Client system 130 may nod need to send the installation ID explicitly because the installation ID is part of the communication mechanism provided by particular platforms (e.g., Android). The parent entity may receive an installation ID and then may hash the installation ID (in other words, it may retrieve the hash value) and may compare it against the app signature that is stored locally (e.g., on client system 130).

In particular embodiments, all applications may share the same code, so that applications within the family may allow for two-way communication. Thus, a child entity application (e.g., Instagram), may provide its installation ID in response to a request from a parent entity (e.g., Facebook). In cases where the child entity application has an earlier timestamp than the parent entity application (e.g., because it was installed on client system 130 before the parent entity application), two-way communication may ensure that all the family applications use the same installation ID.

In particular embodiments, some platforms (e.g., iOS) applications of sibling entities may share data securely with each other and with the parent entity and the parent entity's application. In these situations, the parent entity may not need to create a local temporary ID (e.g., an installation ID that is replaced with an installation ID of a previously installed application). The first application installed may generate an installation ID in shared storage, and the second application may look in the shared storage for any installation ID, and if it exists then it uses the existing installation ID. If no installation ID exists in shared storage, then it is the first application installed on the client device, so it creates a new installation ID, which becomes the family installation ID.

In particular embodiments, the method may further comprise by a transmitting one of the applications in the plurality of family applications, sending a broadcast messaged intended for one or more recipient applications in the plurality of family applications, wherein the broadcast message comprises a hashed installation identifier, by at least one of the recipient applications, de-hashing the hashed installation identifier; and by at least one of the recipient applications, confirming that the de-hashed installation identifier matches one of the plurality of installation identifiers in the list of the plurality of installation identifiers.

In particular embodiments, the method may further comprise: by a server computing machine, identifying two or more applications that are associated with the same family identifier and a single device identifier; and associating the two or more applications that are associated with the same family identifier and a single device identifier with a particular user of an online social network. In particular embodiments, the method may further comprise, by a server computing machine, gathering user data from the first application and using the gathered data to perform at least one user-experience enhancement within the second application, or by a server computing machine, gathering user data from the second application and using the gathered data to perform one or more user-experience enhancements within the first application, wherein the user data comprises a friend list, a phone number, or a content object a user has interacted with, and wherein the one or more user-experience enhancements comprise a friend recommendation, skipping a login request, or recommending content to view. In particular embodiments, the recommended content to view may include one or more advertisements.

Figure 5:
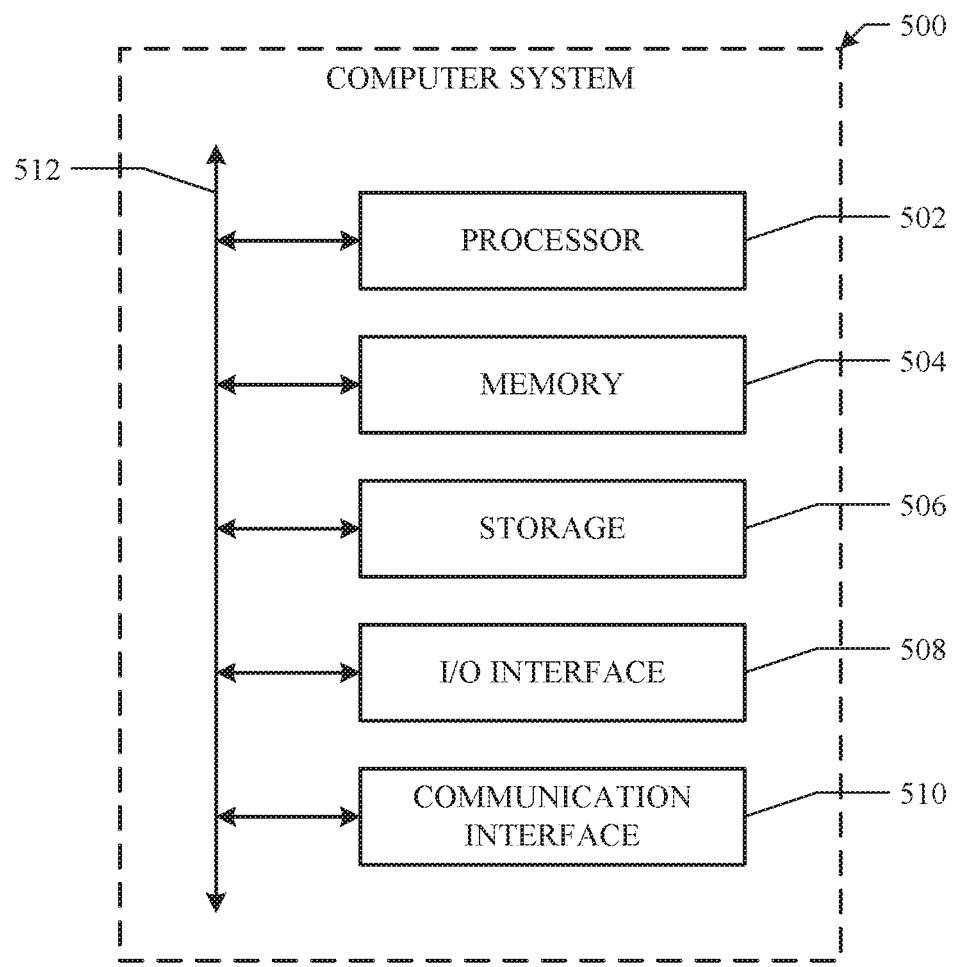
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
  by a second application that is a member of a plurality of family applications and is installed on a client device, broadcasting a communication comprising a second hashed installation identifier, a second authentication key, and a second timestamp, the second timestamp indicating a time that the second application was installed on the client device wherein the second application contains an SDK library;
  by the second application, receiving a response from a first application, wherein the response comprises a first hashed installation identifier, a first authentication key, and a first timestamp indicating a time that the first application was installed on the client device;

by the second application, determining that the first application is a member of the plurality of family applications by comparing the first authentication key to a hashed application signature stored in the SDK library;

by the second application, determining that the first timestamp predates the second timestamp;

by the second application, based on determining that the first timestamp predates the second timestamp and determining that the first application is a member of the plurality of family applications, saving the first hashed installation identifier within the SDK library of the second application as a family identifier for the plurality of family applications;

accessing user data from the first application and, in the second application, based on the accessed user data, forgoing a login request, recommending content, or providing a friend recommendation on a user interface of the client device; and by the second application, sending a communication to a third party wherein the communication includes user data from the second application and user data from the first application.

2. The method of claim 1, further comprising:
by the first application, broadcasting a communication comprising the first hashed installation identifier and the first timestamp, and
by the first application, saving the first hashed installation identifier as the family identifier if the first application does not receive a response that comprises a hashed installation identifier.

3. The method of claim 1, wherein the first hashed installation identifier appears in the SDK library; and wherein the SDK library comprises a list of a plurality of installation identifiers, wherein each installation identifier of the plurality of installation identifiers corresponds to an application within the plurality of family applications.

4. The method of claim 3, wherein the list of the plurality of installation identifiers is updated upon installation of the second application.

5. The method of claim 3, further comprising:
by a transmitting one of the applications in the plurality of family applications, sending a broadcast messaged intended for one or more recipient applications in the plurality of family applications, wherein the broadcast message comprises a third hashed installation identifier;
by at least one of the recipient applications, de-hashing the hashed installation identifier; and
by at least one of the recipient applications, confirming that the de-hashed installation identifier matches one of the plurality of installation identifiers in the list of the plurality of installation identifiers.

6. The method of claim 5, further comprising:
by a server computing machine, identifying two or more applications that are associated with the same family identifier and a single device identifier; and
by the server computer machine, associating the two or more applications that are associated with the same family identifier and a single device identifier with a particular user of an online social network.

7. One or more computer-readable non-transitory storage media embodying software that is operable when executed to:
broadcast, by a second application that is a member of a plurality of family applications and is installed on a client device, a communication comprising a second hashed installation identifier, a second authentication key, and a second timestamp, the second timestamp indicating a time that the second application was installed on the client device, wherein the second application contains an SDK library;

receive, by the second application, a response from a first application, wherein the response comprises a first hashed installation identifier, a first authentication key, and a first timestamp indicating a time that the first application was installed on the client device;

determine that the first application is a member of the plurality of family applications by comparing the first authentication key to a hashed application signature stored in the SDK library;

determine that the first timestamp predates the second timestamp;

based on determining that the first timestamp predates the second timestamp and determining that the first application is a member of the plurality of family applications, save the first hashed installation identifier within the SDK library of the second application as a family identifier for the plurality of family applications;

access user data from the first application and, in the second application, based on the accessed user data, forgo a login request, recommend content, or provide a friend recommendation on a user interface of the client device; and by the second application, send a communication to a third party wherein the communication includes user data from the second application and user data from the first application.

8. The media of claim 7, wherein the software is further operable when executed to instruct the first application to:
broadcast a communication comprising the first hashed installation identifier and the first timestamp, and
save the first hashed installation identifier as the family identifier if the first application does not receive a response that comprises a hashed installation identifier.

9. The media of claim 7,
wherein the first hashed installation identifier appears in the SDK library; and wherein the SDK library comprises a list of a plurality of installation identifiers, wherein each installation identifier of the plurality of installation identifiers corresponds to an application within the plurality of family applications.

10. The media of claim 9, wherein the list of the plurality of installation identifiers is updated upon installation of the second application.

11. The media of claim 9, wherein the software is further operable when executed to:
by a transmitting one of the applications in the plurality of family applications, send a broadcast messaged intended for one or more recipient applications in the plurality of family applications, wherein the broadcast message comprises a third hashed installation identifier;
by at least one of the recipient applications, de-hash the hashed installation identifier; and
by at least one of the recipient applications, confirm that the de-hashed installation identifier matches one of the plurality of installation identifiers in the list of the plurality of installation identifiers.

12. A system comprising: one or more processors; and a memory coupled to the processors comprising instructions executable by the processors, the processors being operable when executing the instructions to:

broadcast, by a second application that is a member of a plurality of family applications and is installed on a client device, a communication comprising a second hashed installation identifier, a second authentication key, and a second timestamp, the second timestamp indicating a time that the second application was installed on the client device, wherein the second application contains an SDK library;

receive, by the second application, a response from a first application, wherein the response comprises a first hashed installation identifier, a first authentication key, and a first timestamp indicating a time that the first application was installed on the client device;

determine that the first application is a member of the plurality of family applications by comparing the first authentication key to a hashed application signature stored in the SDK library;

determine that the first timestamp predates the second timestamp;

based on determining that the first timestamp predates the second timestamp and determining that the first application is a member of the plurality of family applications, save the first hashed installation identifier within the SDK library of the second application as a family identifier for the plurality of family applications;

access user data from the first application and, in the second application, based on the accessed user data, forgo a login request, recommend content, or provide a friend recommendation on a user interface of the client device; and by the second application, send a communication to a third party wherein the communication includes user data from the second application and user data from the first application.

13. The system of claim 12, wherein the processors are further operable when executing the instructions to instruct the first application to:

broadcast a communication comprising the first hashed installation identifier and the first timestamp, and save the first hashed installation identifier as the family identifier if the first application does not receive a response that comprises a hashed installation identifier.

14. The method of claim 1, wherein the client device facilitates the transfer of the second hashed installation identifier.

15. The method of claim 1, wherein the communication further comprises IP data or client device information.

16. The method of claim 1, wherein the third party is an application developer that published the first application and the second application.

* * * * *